US010017961B2

United States Patent
Tsuruta

(10) Patent No.: US 10,017,961 B2
(45) Date of Patent: Jul. 10, 2018

(54) KEY CYLINDER DEVICE

(71) Applicant: KABUSHIKI KAISHA TOKAI RIKA DENKI SEISAKUSHO, Aichi (JP)

(72) Inventor: Hiroshi Tsuruta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 178 days.

(21) Appl. No.: 15/001,928

(22) Filed: Jan. 20, 2016

(65) Prior Publication Data

US 2016/0215522 A1  Jul. 28, 2016

(30) Foreign Application Priority Data

Jan. 22, 2015 (JP) ................................ 2015-010290

(51) Int. Cl.
  *E05B 29/00*  (2006.01)
  *E05B 35/00*  (2006.01)
  (Continued)

(52) U.S. Cl.
  CPC .......... *E05B 29/0053* (2013.01); *B60R 25/02* (2013.01); *E05B 9/04* (2013.01);
  (Continued)

(58) Field of Classification Search
  CPC ..... E05B 9/00; E05B 9/04; E05B 9/08; E05B 9/084; E05B 9/086; E05B 27/0003;
  (Continued)

(56) References Cited

U.S. PATENT DOCUMENTS 3,748,877 A * 7/1973 Wolter .............. B60R 25/02121
  70/186
3,782,145 A * 1/1974 Wolter .............. B60R 25/02128
  70/186
(Continued)

FOREIGN PATENT DOCUMENTS

EP  1375931 A1  1/2004
JP  2001098800 A  4/2001
(Continued)

OTHER PUBLICATIONS

Extended European Search Report European Application No. 16151989.7-1603.dated Jul. 1, 2016.

*Primary Examiner* — Christopher J Boswell
(74) *Attorney, Agent, or Firm* — Roberts Mlotkowski Safran Cole & Calderon P.C.

(57) ABSTRACT

A key cylinder device includes a rotor case that encloses a rotor operable to rotate by a mechanical key, the rotor being inserted into the rotor case from a direction opposite to an insertion direction of the mechanical key, a holding member including a pair of leg portions held by the rotor case, and a fixing member that protrudes from the holding member. The rotor case includes a fixing member-holding structure that the fixing member is held by the leg portions of the holding member at a temporary assembly position for temporarily assembling the fixing member in a retracted state without inwardly protruding beyond an inner surface of the rotor case and at an assembly position for assembling the fixing member in a state of inwardly protruding from the inner surface of the rotor case.

6 Claims, 7 Drawing Sheets

(51) Int. Cl.
| | |
|---|---|
| *B60R 25/02* | (2013.01) |
| *E05B 85/06* | (2014.01) |
| *E05B 77/44* | (2014.01) |
| *E05B 9/08* | (2006.01) |
| *E05B 9/04* | (2006.01) |
| *E05B 15/14* | (2006.01) |
| *E05B 27/00* | (2006.01) |

(52) U.S. Cl.
CPC .............. *E05B 9/086* (2013.01); *E05B 15/14* (2013.01); *E05B 27/0007* (2013.01); *E05B 29/00* (2013.01); *E05B 77/44* (2013.01); *E05B 85/06* (2013.01)

(58) Field of Classification Search
CPC .. E05B 27/0007; E05B 27/0014; E05B 29/00; B60R 25/02; B60R 25/02102; B60R 25/02105; B60R 25/02107
See application file for complete search history.

(56) References Cited

U.S. PATENT DOCUMENTS

| | | | | |
|---|---|---|---|---|
| 4,972,692 | A | * | 11/1990 | Morikawa ......... B60R 25/02102 70/186 |
| 5,632,167 | A | * | 5/1997 | Kawachi ............... B60R 25/021 70/1.5 |
| 6,364,586 | B1 | | 4/2002 | Okada |
| 6,442,985 | B1 | * | 9/2002 | Watanuki ................ B60R 25/04 70/186 |
| 8,234,895 | B2 | * | 8/2012 | Nakamoto ............. B60R 25/02 70/182 |
| 9,745,776 | B2 | * | 8/2017 | Tsuruta ............... E05B 29/0013 |
| 2002/0178769 | A1 | * | 12/2002 | Okuno ..................... E05C 1/14 70/107 |

FOREIGN PATENT DOCUMENTS

| | | |
|---|---|---|
| JP | 3346706 B2 | 11/2002 |
| JP | 2004262337 A | 9/2004 |
| JP | 2004263441 A | 9/2004 |

* cited by examiner

KEY CYLINDER DEVICE

The present application is based on Japanese patent application No. 2015-010290 filed on Jan. 22, 2015, the entire contents of which are incorporated herein by reference.

BACKGROUND OF THE INVENTION

1. Field of the Invention

The invention relates to a key cylinder device provided with a key cylinder to be rotated by insertion of a mechanical key.

2. Description of the Related Art

A key cylinder device is known which is assembled into a vehicle steering lock device (see e.g., JP-B-3346706).

The key cylinder device disclosed in JP-B-3346706 is provided with a cylinder lock having a rear-side assembly structure in which an inner cylinder is rotatably inserted in an outer cylinder from a rear side (i.e., a steering lock device side).

The cylinder lock is constructed such that a lock pin protrudes from the inner surface of the outer cylinder to come into contact with a flange-shaped portion formed on the rear side of the inner cylinder, thereby blocking the inner cylinder from moving toward the rear side.

After the inner cylinder is inserted in the outer cylinder, the lock pin for blocking the inner cylinder from moving toward the rear side is inserted via a spring into a recessed portion formed on the outer cylinder and is then attached to the outer cylinder by fixing a hold-down plate by means of crimping etc.

SUMMARY OF THE INVENTION

The cylinder lock needs a long component assembly process since many components, e.g. a key insertion detection mechanism for detecting insertion of a key in a key insertion hole and a locking mechanism for holding the inner cylinder at a locked/unlocked position, are assembled in addition to the lock pin, the spring and the hold-down plate. To shorten each step of the component assembly process, the components may be pre-assembled in a preceding process before the inner cylinder is assembled into the outer cylinder.

In the rear-side assembly structure where the inner cylinder is inserted into the outer cylinder from the rear side, the lock pin, the spring and the hold-down plate cannot be assembled before the inner cylinder is assembled into the outer cylinder. Thus, even if each process of the component assembly process is shortened, the entire assembly process will not be shortened due to the restriction of the assembly sequence. The manufacturing cost may be thereby increased.

It is an object of the invention to provide a key cylinder device that increases the degree of freedom in the assembly sequence.

(1) According to an embodiment of the invention, a key cylinder device comprises:

a rotor case that encloses a rotor operable to rotate by a mechanical key, the rotor being inserted into the rotor case from a direction opposite to an insertion direction of the mechanical key;

a holding member comprising a pair of leg portions held by the rotor case; and a fixing member that protrudes from the holding member, wherein the rotor case comprises a fixing member-holding structure that the fixing member is held by the leg portions of the holding member at a temporary assembly position for temporarily assembling the fixing member in a retracted state without inwardly protruding beyond an inner surface of the rotor case and at an assembly position for assembling the fixing member in a state of inwardly protruding from the inner surface of the rotor case.

In the above embodiment (1) of the invention, the following modifications and changes can be made.

(i) The fixing member-holding structure comprises a pair of vertical walls and a protruding portion horizontally protruding from each of the vertical walls, wherein the pair of vertical walls are formed upright on an outer surface of the rotor case such that the fixing member is arranged between the vertical walls while penetrating the rotor case from the outer surface to the inner surface, and wherein the protruding portion is configured such that the leg portions of the holding member are held by at the temporary assembly position and at the assembly position.

(ii) The protruding portion comprises first and second protrusions that are arranged vertically intermittently and are formed to protrude from the outer surface of each vertical wall, wherein the first protrusion is formed as a temporary holding member to temporarily hold the leg portion of the holding member at the temporary assembly position, and wherein the second protrusion is formed as a holding member to hold the leg portion of the holding member at the assembly position.

(iii) The protruding portion comprises a single protruding portion comprising a guide surface inclined downward and an inclined surface continued from the peak position of the guide surface and inclined inward and downward, and the inclined surface is formed as a temporary holding member to temporarily hold the leg portion of the holding member at the temporary assembly position.

(iv) The key cylinder device further comprises a sleeve between the rotor and the rotor case, wherein the fixing member is withdrawn from a locking hole formed in the sleeve at the temporary assembly position so as to allow an insertion of the sleeve into the rotor case and inserted into the locking hole at the assembly position so as to prevent a separation of the sleeve from the rotor case.

Effect of the Invention

According to an embodiment of the invention, a key cylinder device can be provided that increases the degree of freedom in the assembly sequence.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Preferred embodiments of the invention will be described below in conjunction with the appended drawings. In the following description, front means a key insertion hole side of a key cylinder, rear means a rear side of the key insertion hole, and upper, lower, left and right are directions when viewing the key insertion hole from the front.

First Embodiment

General Configuration of Key Cylinder Device

Figure 1:
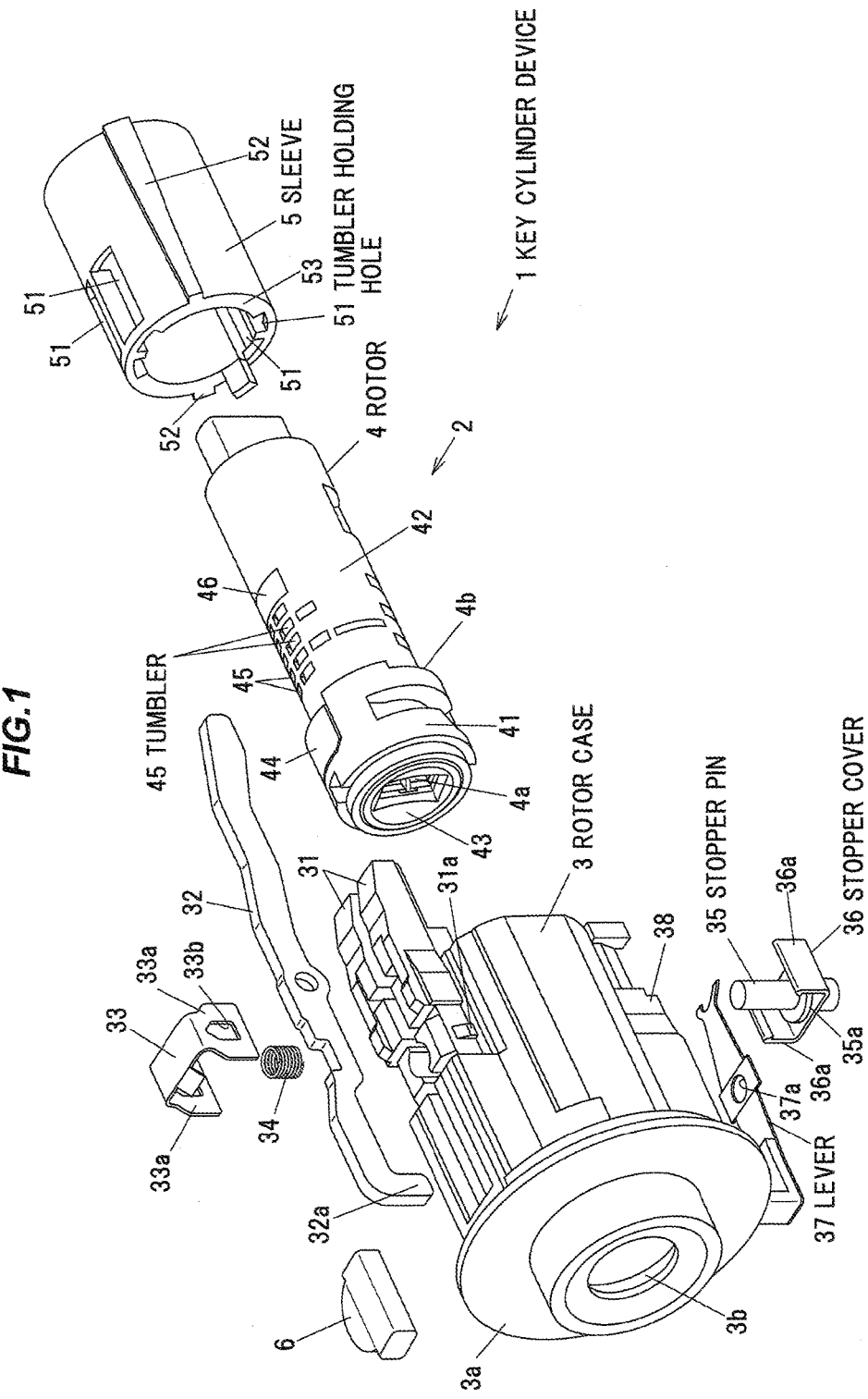
FIG. 1 is an exploded perspective view showing a key cylinder device of a first preferred embodiment according to the present invention.

FIG. 1 shows a configuration example of a typical key cylinder device in the first embodiment which is indicated generally by the reference numeral 1. The key cylinder device 1 is assembled into a steering lock device operable to prevent a rotating operation of a column shaft (not shown) when a vehicle is parked.

The key cylinder device 1 in the illustrated example is provided with a key cylinder 2 capable of mechanical authentication of a mechanical key (not shown) (hereinafter, referred to as "key"). The key cylinder 2 is provided with a cylindrical rotor case 3 and a columnar rotor 4. The rotor case 3 has an opening at an end on the opposite side to a key insertion hole 4a into which a key is inserted. The rotor 4 is rotatably housed in the rotor case 3. The rotor 4 is assembled to the rotor case 3 in a direction opposite to a key insertion direction and this increases resistance of the rotor 4 to pull-out from the rotor case 3.

The rotor 4 has the key insertion hole 4a formed along a direction of a rotor rotation axis. Rotational operation of the key changes the position of the rotor 4 between first to fourth positions which are an LOCK position, an ACC (accessory) position, an ON position and a START position in a clockwise direction as viewing the key insertion hole 4a from the front.

The steering lock device is locked when the rotor 4 is located at the LOCK position, and is unlocked when the rotor 4 is located at any position from the ACC position to the START position.

The rotor 4 is coupled to a camshaft which is a component of the steering lock device to operate an ignition switch (not shown). When the rotor 4 is rotationally operated from the LOCK position through the ACC position to the ON position or the START position, connection of the contact point of the ignition switch is switched via the camshaft. Based on the connection state of the ignition switch changed by the switching operation, the status of various on-vehicle devices and an engine is switched.

Configuration of Rotor Case

As shown in FIG. 1, the rotor case 3 is formed of a cylindrical member with a circular flange-shaped case and has a key operation hole 3b on a flange portion 3a. A constituent material of the rotor case 3 is, e.g., a metal material such as die-cast zinc.

Two support walls 31 defining a recess therebetween along a key insertion direction are formed on an upper peripheral portion of the rotor case 3, and a locking lever 32 is pivotally supported between the support walls 31. The locking lever 32 has, e.g., a key insertion detection function for detecting insertion of a key and a lock function for holding a locking member such as locking bar or lock stopper which enables or disables a rotating operation of the column shaft.

To the locking lever 32, a coil spring 34 is attached in a state of being covered with a cover plate 33 which is to be fixed to the rotor case 3. The locking lever 32 is pressed toward the rotor 4 by a spring force of the coil spring 34. Protrusions 31a formed to protrude from the outer surfaces of the support walls 31 on the right and left sides of the rotor case 3 are snap-fitted into and fixed to holes 33b formed on a pair of leg portions 33a on the both sides of the cover plate 33.

A columnar stopper pin 35, which is a fixing member used to attach the key cylinder 2 to a lock body (not shown), vertically movably penetrates the lower peripheral portion of the rotor case 3. The stopper pin 35 has a disc-shaped flange 35a. The outer surface of the flange 35a is fixed to the inside of a stopper cover 36 as a holding member of which pair of leg portions 36a on both sides are fixed to the rotor case 3. The inner surface of the flange 35a is pressed toward the lock body by an elastic force of a lever 37.

The rotor case 3 is housed and fixed via a wobble-inhibiting rubber packing 6 inside the lock body which is formed of a metal material such as die-cast zinc. The rubber packing 6 is fitted and fixed to a packing holder 3c which is formed to protrude from a lock body-facing surface of the rotor case 3, as shown in FIGS. 4B and 4C.

Configuration of Rotor

As shown in FIG. 1, the rotor 4 has a shape with a step such that a large diameter rotor portion 41 having a key insertion detection function and a small diameter rotor portion 42 having a key checking function for checking a mechanical match of a key are integrally coupled with a level difference portion therebetween.

A front cover 43 having a key insertion slot is housed in and fixed to a front opening of the large diameter rotor portion 41. A sliding piece 44 is housed in the peripheral portion of the large diameter rotor portion 41 so as to be movable in a radial direction of the rotor when inserting/extracting the key. A bent piece 32a formed by bending a front end of the locking lever 32 is arranged to face the outer surface of the sliding piece 44.

Meanwhile, plural tumblers 45 having a plate shape elongated in a radial direction and a locking piece 46 for preventing rotation of the camshaft are housed inside the small diameter rotor portion 42 so as to be resiliently retractable. A tumbler hole (not shown) to be engaged with a groove of the key is formed on each tumbler 45. The tumblers 45, when engaged with the key grooves through the tumbler holes, are thereby elastically held inside the small diameter rotor portion 42 at a predetermined position to be a key checking position for checking a mechanical match of the key.

In the state that the key is not inserted into the small diameter rotor portion 42, protruding end portions of the tumblers 45 protrude beyond the outer peripheral surface of the small diameter rotor portion 42 and rotation of the rotor 4 is restricted by engagement of the protruding end portions with the inner peripheral surface of the rotor case 3.

In the state that the key is inserted into the key insertion hole 4a, the tumblers 45 engaged with the grooves of the key all retract inward beyond the outer peripheral surface of the rotor 4. As a result, the rotor 4 can be rotationally operated without contact of any tumblers 45 with the inner peripheral surface of the rotor case 3.

Compatible Configuration of Rotor Case

The shape and number of the tumblers 45 are different depending on the shape of key, and the rotor 4 needs to be changed according to the shape and number of the tumblers 45. Then, changing the rotor 4 involves change of the shape of the rotor case 3 since the key insertion detection function and the lock function of the locking lever 32 are realized by the shape of the rotor case 3.

Based on this, a cylindrical metal sleeve 5 is used to allow the rotor case 3 to have compatibility even when the rotor 4 is changed to match a different shape of key. The position of the sleeve 5 to restrict rotation of the rotor 4 is set to correspond to a changed key shape. By providing the sleeve 5 having a function of allowing the rotor case 3 to have compatibility, it is possible to reduce the types of components.

Two tumbler holding holes 51 having a long shape elongated in the direction of the rotor rotation axis and arranged side by side are formed on each of two opposing sides of the sleeve 5 so as to penetrate the peripheral portion of the sleeve 5. The tumbler holding holes 51 serve to allow the protruding end portions of the tumblers to be disengaged when the key is inserted, and to be engaged when the key is extracted.

The sleeve 5 is formed to have a size (outer diameter) and a thickness which match the shape of a key to be used and the type and number, etc., of the tumblers 45, and the suitable number of the tumbler holding holes 51 having a suitable size and arranged at suitable positions are selected and used according to the shape of the key to be used and the type and number, etc., of the tumblers 45. It is therefore obvious that the positions and number, etc., of the tumbler holding holes 51 are not limited to those in the illustrated example.

Figure 2:
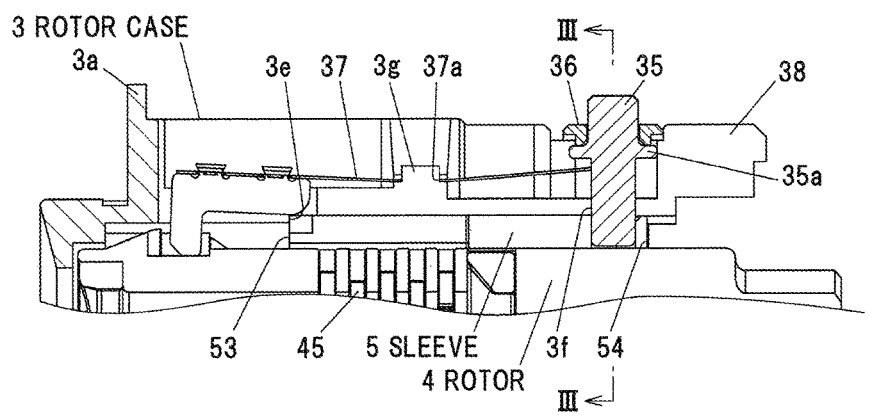
FIG. 2 is a cross sectional view showing a main part in the key cylinder device of the first embodiment.
Figure 3:
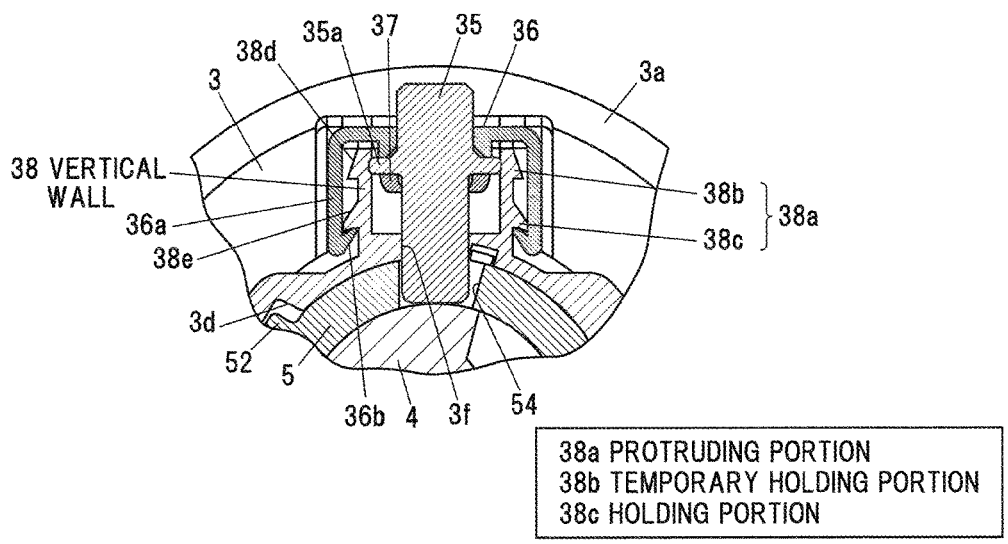
FIG. 3 is an enlarged cross sectional view taken along a line III-III in FIG. 2 as viewed in a direction of an arrow.

The rotor 4 is inserted into the sleeve 5 which is thus placed around the outer peripheral surface of the small diameter rotor portion 42 as shown in FIGS. 1 to 3, and the key cylinder 2 has a multiple cylindrical wall structure composed of the rotor case 3, the rotor 4 and the sleeve 5. Guide ribs 52 extending and tapering in the insertion direction are formed to protrude from the outer peripheral surface of the sleeve 5 at two opposing positions and are inserted into and fixed to guide recesses 3d formed on the inner peripheral surface of the rotor case 3.

An opening end face 53 located on the front side of the sleeve 5 is configured as a stopping surface which comes into contact with an annular step surface 4b formed between the large diameter rotor portion 41 and the small diameter rotor portion 42 and also with an annular stepped portion 3e formed on the inner peripheral surface of the rotor case 3 and located behind the flange portion 3a, and thereby prevents the rotor 4 from being pulled out.

Figure 4A:
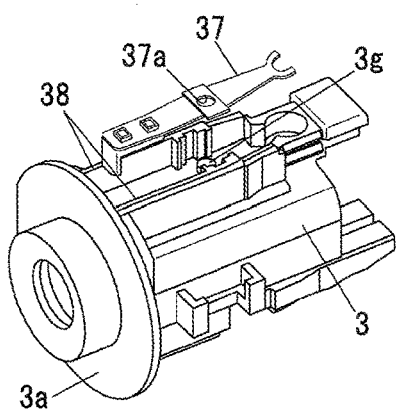
FIG. 4A is an exploded perspective view showing a main part in the key cylinder device of the first embodiment at an assembly step.
Figure 4B:
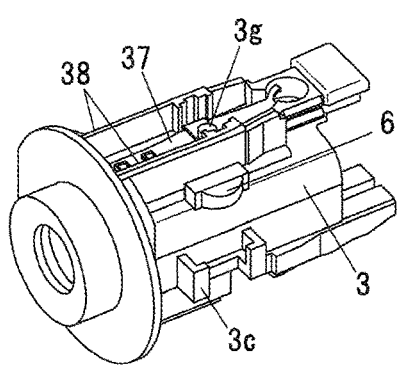
FIG. 4B is an exploded perspective view showing the main part at an assembly step following FIG. 4A.
Figure 4C:
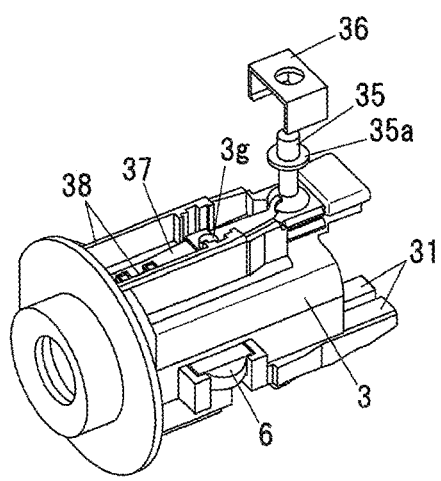
FIG. 4C is an exploded perspective view showing the main part at an assembly step following FIG. 4B.
Figure 4D:
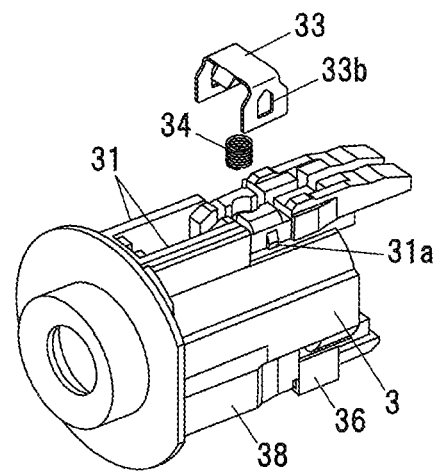
FIG. 4D is an exploded perspective view showing the main part at an assembly step following FIG. 4C.
Figure 4E:
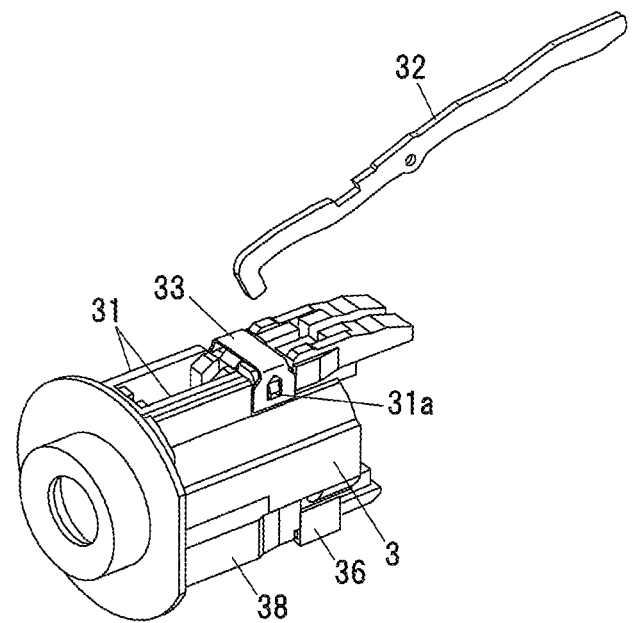
FIG. 4E is an exploded perspective view showing the main part at an assembly step following FIG. 4D.
Figure 4F:
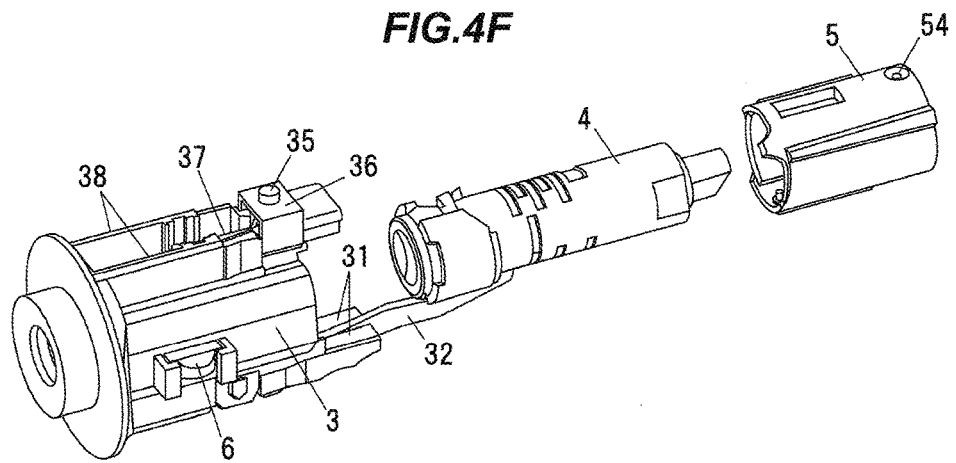
FIG. 4F is an exploded perspective view showing the main part at an assembly step following FIG. 4E.

As shown in FIGS. 2, 3 and 4F, a rhombus-shaped locking hole 54 for fitting and fixing the stopper pin 35 is formed to penetrate a rear end portion of the sleeve 5. The locking hole 54 is configured as a stopping portion to which the stopper pin 35 penetrating the lower peripheral portion of the rotor case 3 is fitted and which thereby prevents the pull-out.

Stopper Pin Holding Structure

The key cylinder device 1 configured as described above has a rear-side assembly structure that the rotor 4 and the sleeve 5 are assembled into the rotor case 3 from a direction opposite to the key insertion direction. As in prior art, without the stopper pin holding structure according to the invention, the stopper pin 35 cannot be fitted and fixed to the rear end portion of the sleeve 5 through the outer surface of the rotor case 3 before the rotor 4 and the sleeve 5 are assembled into the inside of the rotor case 3. Thus, the conventional assembly process will be restricted by the assembly sequence of the key cylinder 2.

By contrast, according to the invention, a stopper pin holding structure is used that allows an arbitrary assembly sequence without the restriction of the assembly sequence of the key cylinder 2. In the illustrated example, the rotor case 3 has a fixing member-holding structure in which the stopper pin 35 is held, via the stopper cover 36, at a temporary assembly position for temporary assembly with a distance from the sleeve 5, and then at an assembly position for assembly to the locking hole 54 of the sleeve 5.

As shown in FIGS. 1 to 3, the stopper pin holding structure is provided with two vertical walls 38 formed upright on the outer surface of the rotor case 3 and defining a recess therebetween, and protruding portions 38a each composed of a pair of vertically intermittently arranged protrusions and formed to protrude respectively from the outer surfaces of the vertical walls 38 on the right and left sides of the recess.

The stopper pin 35 is arranged through a through-hole 3f formed in the recess defined between the vertical walls 38 so as to penetrate the rotor case 3 from the outer surface to the inner surface, and the pair of leg portions 36a of the stopper cover 36 to which the stopper pin 35 is inserted and fixed are held by the protruding portions 38a of the vertical walls 38 defining a recess.

The protruding portion 38a of the rotor case 3 is composed of a temporary holding portion 38b for temporarily holding the stopper pin 35 via the stopper cover 36, and a holding portion 38c located below the peak position of the temporary holding portion 38b so as to protrude outward beyond the peak position of the temporary holding portion 38b. The temporary holding portion 38b is the temporary assembly position for assembling the stopper pin 35 with a distance from the sleeve 5, while the holding portion 38c is the assembly position for assembling the stopper pin 35 to the locking hole 54 of the sleeve 5.

Each of the temporary holding portion 38b and the holding portion 38c is formed of a triangular block extending throughout substantially the entire width of the stopper cover 36. In addition, in each protruding portion 38a, surfaces of the temporary holding portion 38b and the holding portion 38c on the stopper cover insertion side are respectively formed as guide surfaces 38d and 38e which are inclined downward.

Meanwhile, the stopper cover 36 is formed of, e.g., an elastic resin material and has locking hooks 36b on inner surfaces of the front end portions of the pair of leg portions 36a. A distance between pointed tips of the pair of locking hooks 36b is smaller than distances between the peaks of the pair of temporary holding portions 38b and between the peaks of the pair of holding portions 38c of the rotor case 3.

Therefore, when the leg portions 36a of the stopper cover 36 pass beyond the guide surfaces 38d of the temporary holding portions 38b of the rotor case 3, the leg portions 36a once elastically stretched open return to the original shape and the locking hooks 36b of the stopper cover 36 are temporarily locked to the rims of the temporary holding portions 38b on the back side. At this time, the stopper pin 35 is located at the temporary assembly position for temporary assembly in a retracted state without inwardly protruding beyond the inner surface of the rotor case 3 and is not fitted and fixed to the locking hole 54 of the sleeve 5.

When the leg portions 36a of the stopper cover 36 leaves the rims on the back side of the temporary holding portions 38b of the rotor case 3 and then pass beyond the guide surfaces 38e of the holding portions 38c, the leg portions 36a once elastically stretched open return to the original shape and the locking hooks 36b of the stopper cover 36 are locked to the holding portions 38c on the back side. At this time, the stopper pin 35 is located at the assembly position for assembly in a state of inwardly protruding from the inner surface of the rotor case 3 and is fitted and fixed to the locking hole 54 of the sleeve 5.

Key Cylinder Assembly Process

When assembling the key cylinder 2 configured as described above, a stopper pin temporary assembly step for temporarily assembling the stopper pin 35 to the rotor case 3 is performed before assembling the rotor 4 and the sleeve 5 to the rotor case 3, as shown in FIGS. 4A to 5C.

To assemble the key cylinder 2, firstly, an attachment hole 37a of the lever 37 is fixed to an attachment pin 3g formed to protrude between the recess-shaped vertical walls 38 of the rotor case 3, as shown in FIG. 4A.

Next, as shown in FIG. 4B, the rubber packing 6 is fitted and fixed to the packing holder 3c of the rotor case 3.

Next, as shown in FIG. 4C, the stopper pin 35 is fitted to the stopper cover 36. Before assembling the rotor 4 and the sleeve 5 to the inside of the rotor case 3, the stopper pin 35 and the stopper cover 36 are inserted between the vertical walls 38 of the rotor case 3 via a tip of the lever 37.

Figure 5A:
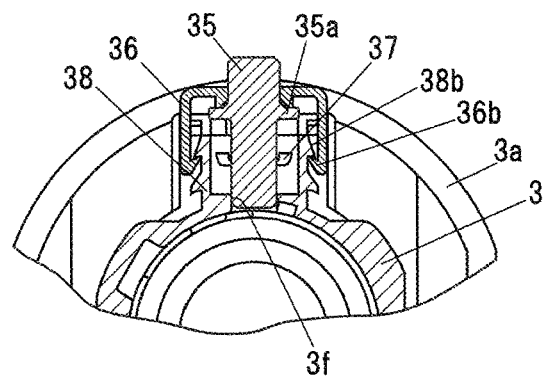
FIG. 5A is a cross sectional view partially showing the assembled situation of the device at the assembly step in FIG. 4C.

When the stopper cover 36 is pushed down, the locking hooks 36b of the stopper cover 36 are temporarily locked to the rims on the back side of the temporary holding portions 38b of the rotor case 3, as shown in FIG. 5A. At this time, an end portion of the stopper pin 35 is temporarily held at a predetermined position in the through-hole 3f of the rotor case 3.

Next, as shown in FIG. 4D, after the rotor case 3 is flipped over, the coil spring 34 is inserted between the support walls 31 of the rotor case 3 and the protrusions 31a of the rotor case 3 are snap-fitted into the holes 33b of the cover plate 33 against the spring force of the coil spring 34.

Next, as shown in FIG. 4E, the locking lever 32 is inserted so as to be supported between the support walls 31 of the rotor case 3.

Figure 5B:
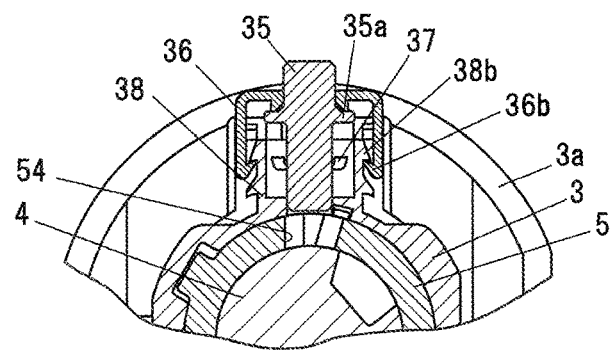
FIG. 5B is a cross sectional view partially showing the assembled situation of the device at the assembly step in FIG. 4F.

Next, as shown in FIG. 4F, after the rotor case 3 is flipped over again and the sleeve 5 is assembled to the rotor 4, the rotor 4 and the sleeve 5 are assembled to the inside of the rotor case 3 from a direction opposite to the key insertion direction. Once the rotor 4 and the sleeve 5 are assembled, the locking hole 54 of the sleeve 5 is arranged at a position corresponding to the stopper pin 35, as shown in FIG. 5B.

Figure 4G:
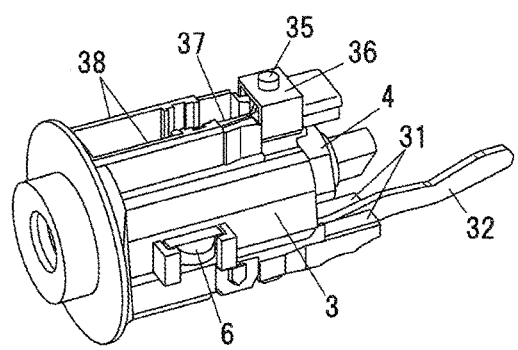
FIG. 4G is a perspective view showing the last step in the assembly process of the key cylinder device.
Figure 4H:
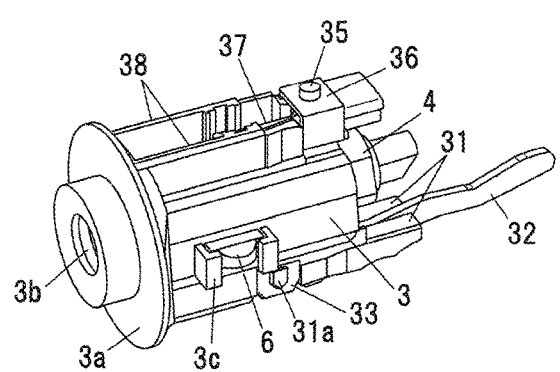
FIG. 4H is a perspective view showing the completely assembled key cylinder device.
Figure 5C:
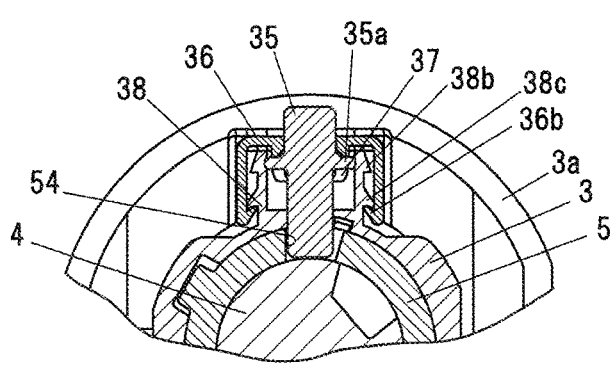
FIG. 5C is a cross sectional view partially showing the assembled situation of the completely assembled device.

Next, as shown in FIGS. 4G and 4H, the stopper cover 36 is pushed down while sandwiching the vertical walls 38. When the stopper cover 36 is pushed down, the leg portions 36a of the stopper cover 36 are locked to the holding portions 38c on the back side, as shown in FIG. 5C. The stopper pin 35 is fitted and fixed to the locking hole 54 of the sleeve 5.

The completely assembled key cylinder 2 shown in FIG. 4H is obtained through a series of the assembly steps described above.

Effects of the First Embodiment

The key cylinder device 1 configured as described above exerts the following effects, in addition to the effects described above.

(1) The stopper pin 35 and the stopper cover 36 can be assembled into the rotor case 3 in a step prior to assembling the rotor 4 and the sleeve 5 into the rotor case 3.

(2) The degree of freedom of the assembly sequence increases, allowing the assembly process to be shortened and the manufacturing cost to be reduced.

Second Embodiment

Figure 6A:
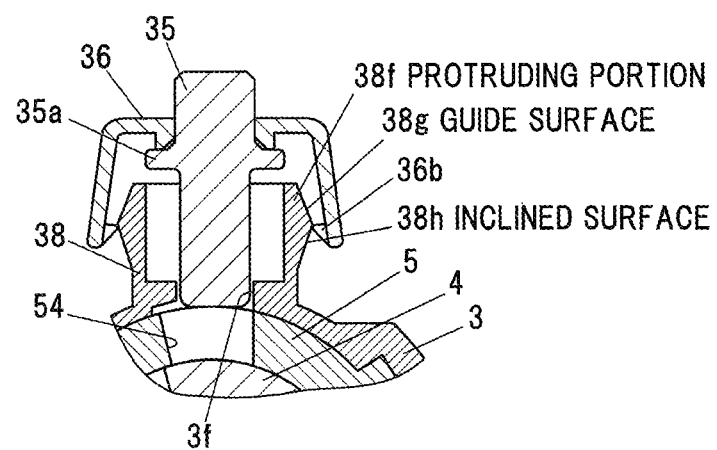
FIG. 6A is a cross sectional view showing a stopper pin used in a key cylinder device in a second embodiment at an assembly step thereof.
Figure 6B:
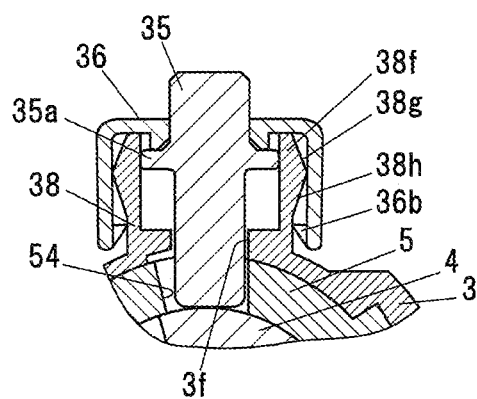
FIG. 6B is a cross sectional view showing the assembled stopper pin shown in FIG. 6A.

FIGS. 6A and 6B show an assembly step and an assembled situation of the stopper pin which is used in a key cylinder device in the second embodiment. Members which are substantially the same as those in the first embodiment are denoted by the same names and reference numerals in FIGS. 6A and 6B and the detailed explanation for such members will be omitted.

In the stopper pin holding structure of the first embodiment, the protruding portions 38a having plural steps are respectively arranged on the outer surfaces of the vertical walls 38 formed upright on the outer surface of the rotor case 3 and defining a recess therebetween. The second embodiment is different from the first embodiment in that the stopper pin holding structure is configured such that a single protruding portion 38f is arranged on the outer surface of each vertical wall 38 of the rotor case 3.

The stopper pin holding structure in FIGS. 6A and 6B is provided with a pair of protruding portions 38f respectively formed on the outer surfaces of the vertical walls 38 of the rotor case 3 on the right and left sides of the recess. Each protruding portion 38f is formed of a triangular block having a guide surface 38g and an inclined surface 38h. The guide surface 38g is a surface on the stopper cover insertion side and is inclined downward. The inclined surface 38h is continued from the peak position of the guide surface 38g and is inclined inward and downward. The protruding portion 38f is formed to extend throughout substantially the entire width of the stopper cover 36.

A distance between the pointed tips of the locking hooks 36b of the stopper cover 36 is smaller than a distance between the peaks of the pair of the protruding portions 38f of the rotor case 3. Therefore, when the leg portions 36a of the stopper cover 36 reach the peak positions of the guide surfaces 38g of the protruding portions 38f of the rotor case 3, the locking hooks 36b of the stopper cover 36 are temporarily locked to the inclined surfaces 38h at a position near and below the peak positions in a state of being open.

When the leg portions 36a of the stopper cover 36 pass through the inclined surfaces 38h below the peak positions of the protruding portions 38f of the rotor case 3, the leg portions 36a once elastically stretched open return to the original shape and the locking hooks 36b of the stopper cover 36 are locked to the vertical walls 38 at the lower edges of the inclined surfaces 38h of the protruding portions 38f.

Effects of the Second Embodiment

The key cylinder device 1 in the second embodiment exerts the following effects, in addition to the effects of the first embodiment.

It is possible to simplify the shape of the vertical wall 38 of the rotor case 3 used for the stopper pin holding structure, and also to reduce the weight of the key cylinder 2.

Although, in the typical configuration example of the invention, the stopper pin holding structure is applied to the key cylinder device 1 in which the sleeve 5 placed around the rotor 4 and fixed to the inner surface of the rotor case 3 is provided to allow the rotor case 3 to have compatibility, the invention is not limited thereto. The stopper pin holding structure can be effectively applied to the key cylinder device 1 configured so that, e.g., the rotor 4 is rotatably housed in the rotor case 3 without providing the sleeve 5.

In addition, although the key cylinder device 1 is applied to a car in the typical configuration example of the invention, it is not limited thereto. It is obvious that the invention can be effectively applied to, e.g., various vehicles such as construction machineries and agricultural machineries.

It is obvious from the above description that the invention according to claims is not to be limited to the typical embodiments and illustrated examples of the invention. Therefore, it should be noted that all combinations of the features described in the embodiments and illustrated examples are not necessary to solve the problem of the invention.

What is claimed is:

1. A key cylinder device, comprising:
a rotor case that encloses a rotor operable to rotate by a mechanical key, the rotor being inserted into the rotor case from a direction opposite to an insertion direction of the mechanical key;
a lock body that houses the rotor case;
a holding member comprising a pair of leg portions held by the rotor case; and
a fixing member that protrudes from the holding member, the fixing member being arranged to attach the rotor case to the lock body,
wherein the rotor case comprises a fixing member-holding structure that the fixing member is held by the leg portions of the holding member at a temporary assembly position for temporarily assembling the fixing member in a retracted state without inwardly protruding beyond an inner surface of the rotor case and at an assembly position for assembling the fixing member in a state of inwardly protruding from the inner surface of the rotor case,
wherein the rotor case is configured to completely receive the rotor only in a direction opposite to an insertion direction of the mechanical key.

2. The key cylinder device according to claim 1,
wherein the fixing member-holding structure comprises a pair of vertical walls and a protruding portion horizontally protruding from each of the vertical walls,
wherein the pair of vertical walls are formed upright on an outer surface of the rotor case such that the fixing member is arranged between the vertical walls while penetrating the rotor case from the outer surface to the inner surface, and
wherein the protruding portion is configured such that the leg portions of the holding member are held by at the temporary assembly position and at the assembly position.

3. The key cylinder device according to claim 2,
wherein the protruding portion comprises first and second protrusions that are arranged vertically intermittently and are formed to protrude from the outer surface of each vertical wall,
wherein the first protrusion is formed as a temporary holding member to temporarily hold the leg portion of the holding member at the temporary assembly position, and
wherein the second protrusion is formed as a holding member to hold the leg portion of the holding member at the assembly position.

4. The key cylinder device according to claim 2,
wherein the protruding portion comprises a single protruding portion comprising a guide surface inclined downward and an inclined surface continued from the peak position of the guide surface and inclined inward and downward, and the inclined surface is formed as a temporary holding member to temporarily hold the leg portion of the holding member at the temporary assembly position.

5. The key cylinder device according to claim 1,
further comprising a sleeve between the rotor and the rotor case,
wherein the fixing member is withdrawn from a locking hole formed in the sleeve at the temporary assembly position so as to allow an insertion of the sleeve into the rotor case and inserted into the locking hole at the assembly position so as to prevent a separation of the sleeve from the rotor case.

6. A key cylinder device, comprising:
a rotor case that encloses a rotor operable to rotate by a mechanical key, the rotor being inserted into the rotor case from a direction opposite to an insertion direction of the mechanical key;
a lock body that houses the rotor case;
a holding member comprising a pair of leg portions held by the rotor case; and
a fixing member that protrudes from the holding member, the fixing member being arranged to attach the rotor case to the lock body,
wherein the rotor case comprises a fixing member-holding structure including at least two detent surfaces on opposing sides that resiliently engage and hold both leg portions of the holding member at two positions on the fixing member-holding structure, including:
a temporary assembly position for temporarily assembling the fixing member in a retracted state without inwardly protruding beyond an inner surface of the rotor case, and
an assembly position for assembling the fixing member in a state of inwardly protruding from the inner surface of the rotor case.

* * * * *